(12) United States Patent
Ponting et al.

(10) Patent No.: US 6,671,666 B1
(45) Date of Patent: *Dec. 30, 2003

(54) RECOGNITION SYSTEM

(75) Inventors: Keith M Ponting, Malvern (GB);
Robert W Series, Malvern (GB);
Michael J Tomlinson, Malvern (GB)

(73) Assignee: Qinetiq Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,571

(22) PCT Filed: Feb. 24, 1998

(86) PCT No.: PCT/GB98/00593
§ 371 (c)(1),
(2), (4) Date: Aug. 24, 1999

(87) PCT Pub. No.: WO98/43237
PCT Pub. Date: Oct. 1, 1998

(30) Foreign Application Priority Data

Mar. 25, 1997 (GB) ............................................. 9706174

(51) Int. Cl.[7] .......................... G10L 15/20; G10L 21/02
(52) U.S. Cl. ...................................... 704/233; 704/226
(58) Field of Search ................................ 704/222, 265, 704/226, 233, 231, 255, 256

(56) References Cited

U.S. PATENT DOCUMENTS

| | | | | |
|---|---|---|---|---|
| 5,655,057 | A | * | 8/1997 | Takagi ......................... 704/226 |
| 5,796,924 | A | * | 8/1998 | Errico et al. ................... 706/15 |
| 5,854,999 | A | * | 12/1998 | Hirayama .................... 704/226 |
| 6,377,918 | B1 | * | 4/2002 | Series ........................ 704/226 |

FOREIGN PATENT DOCUMENTS

EP     0 660 300     6/1995

OTHER PUBLICATIONS

Holmes et al, 1996, "Modeling speech Variability with Segmental HMMS", International Conference on Acoustics, Speech, and Signal Processing, col. 1, pp. 447–450.*

Holmes, JN, 1998, Speech Synthesis and Recognition, pp 122–123.*

Madisetti et al, 1998, The Digital Signal Processing Handbook, pp. 25–7, 25–8.*

Russell, M., "A Segmental HMM for Speech Pattern Modeling", ICASSP–93, IEEE International Conference on Acoustics, Speech, and Signal Processing, vol. 2, pp. 499–502.*

(List continued on next page.)

Primary Examiner—Tāalivaldis Ivars Smits
Assistant Examiner—Angela A. Armstrong
(74) Attorney, Agent, or Firm—Nixon & Vanderhye P.C.

(57) ABSTRACT

A recognition system (10) incorporates a filterbank analyser (16) producing successive data vectors of energy values for twenty-six frequency intervals in a speech signal. A unit (18) compensates for spectral distortion in each vector. Compensated vectors undergo a transformation into feature vectors with twelve dimensions and are matched with hidden Markov model states in a computer (24). Each matched model state has a mean value which is an estimate of the speech feature vector. A match inverter (28) produces an estimate of the speech data vector in frequency space by a pseudo-inverse transformation. It includes information which will be lost in a later transformation to frequency space. The estimated data vector is compared with its associated speech signal data vector, and infinite impulse response filters (44) average their difference with others. Averaged difference vectors so produced are used by the unit (18) in compensation of speech signal data vectors.

25 Claims, 5 Drawing Sheets

OTHER PUBLICATIONS

Chao et al, "Pseudo–Inverse With Increasing Threshold: an Error–Recovery Pattern Recognition Program", 1992, Neuroinformatics and Neurocomputers, RNNS/IEEE Symposium, vol. 2, pp. 888–894.*

Chao et al, "Combined Orthogonal Vector and Pseudo–Inverse Approach for Robust Pattern Recognition", 1992, Neuroinformatics and Neurocomputers, RNNS/IEEE Symposium, vol. 2, pp. 881–887.*

Zhao, "Self–learning speaker and channel adaptation based on spectral variation source decomposition", Speech Communication, vol. 18, No. 1, Jan. 1996, pp. 65–77.

Sankar et al, "Robust Speech Recognition Based on Stochastic Matching", Proceedings of the International Conference on Acoustics, Speech, and signal processing (ICASSP), Detroit, May 9–12, 1995, Speech, vol. 1, 9 May 1995, Institute of Electrical and Electronics Engineers, pp. 121–124.

Hansen et al, "ICARUS: Source generator based real–time recognition of speech in noisy stressful and Lombard effect environments", *Speech Communication*, vol. 16, No. 4, Jun. 1995, pp. 391–422.

Zaho, "Iterative Self–Learning Speaker and Channel Adaptation Under Various Initial Conditions", *Proceedings of the International Conference on Acoustics Speech and Signal Processing (ICASSP)*, Detroit, May 9–12, 1995, *Speech*, vol. 1, May 9 1995, Institute of Electrical and Electronics Engineers, pp. 712–715.

The Digital Signal Processing Handbook, (1998), pp. 25–7, 25–8.*

* cited by examiner

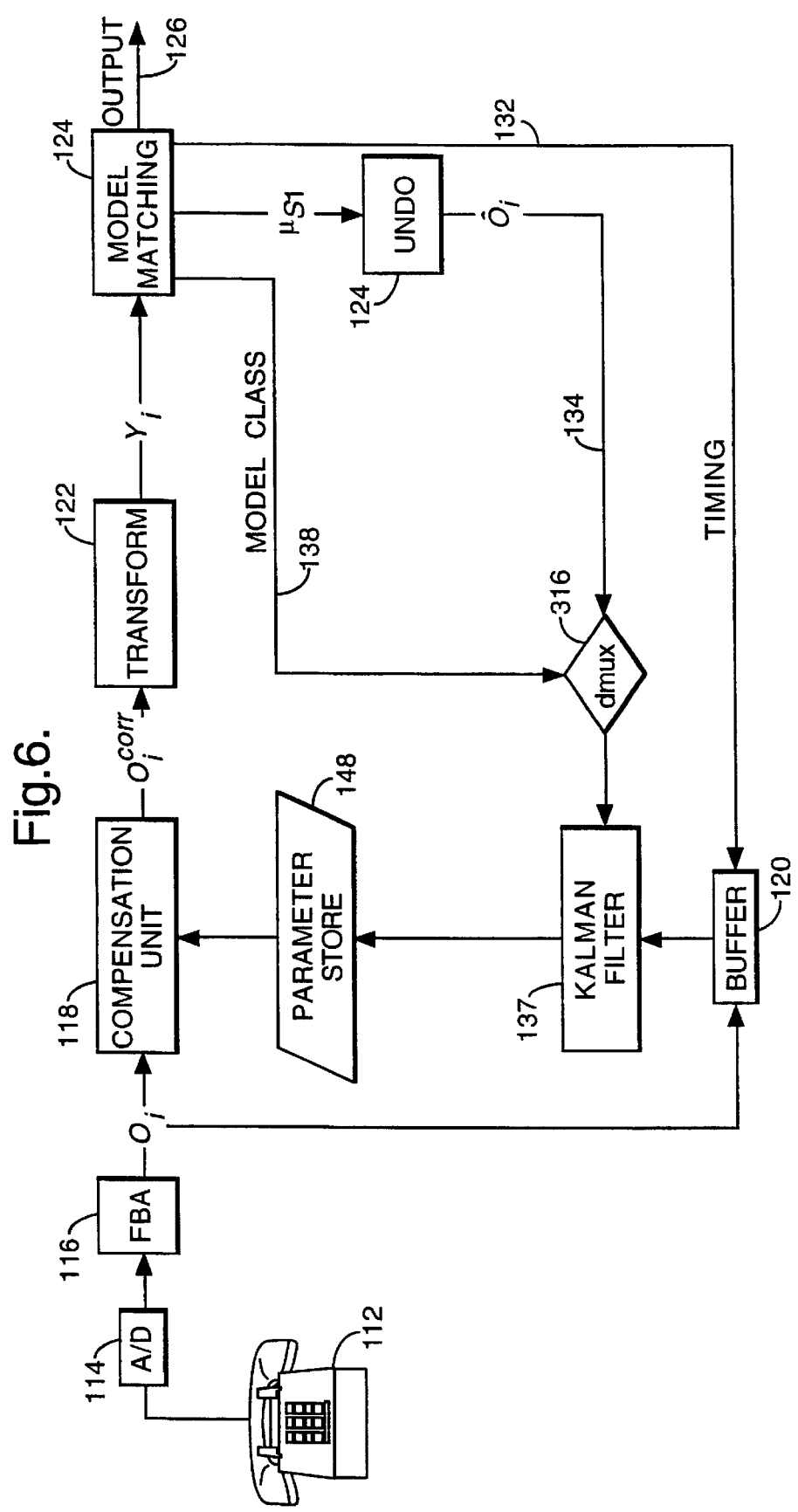

RECOGNITION SYSTEM

This application is the US national phase of International Application No. PCT/GB98/00593, filed Feb. 24, 1998, the entire content of which is hereby incorporated by reference.

BACKGROUND OF THE INVENTION

1. Field of the Invention

This invention relates to a recognition system of the kind which undertakes recognition of data by associating data vectors with predetermined models, and a method of recognition which involves associating such vectors and models; it is particularly relevant to speech and pattern recognition where distortion occurs prior to the recognition process.

2. Discussion of Prior Art

A speech recognition system is a good example of a recognition system in which the data or signal of interest undergoes some form of distortion prior to being available for recognition. In telephone applications in particular, a speech recognition system's performance is often severely degraded by changes to the speech signal due to the position of the telephone handset or by the characteristics of the handset, telephone line and exchange. One particular problem concerns changes in the speech level caused by position of the handset. More sophisticated examination of the problem shows changes to the frequency balance are also significant. Compensation for changes to average signal level are often made by using some form of automatic gain control (AGC). Unfortunately it may be difficult to provide effective AGC; for example, in two wire telephone system configurations there are often substantial differences between the intensity levels of the speech of the persons engaged in the telephone conversation. In four wire configurations there may be significant reverse channel echo which is difficult to deal with. It arises from contamination of the speech of one party to the conversation with that of the other.

One approach to the problem of dealing with distortion is to train a speech recognition system using training data collected using a large variety of handsets and speaker positions. This approach suffers from two problems. First, in the world-wide telephone network there is a very large number of possible microphone types and speaker positions; in consequence the amount of training data required is far too large to be practical and the system is unable to optimise its performance on unknown microphones. Secondly, during recognition, only a small fraction of the training data is used effectively.

One approach to improving recognition performance is to apply some form of compensation to deal with distortion. Current speech recognition systems convert the input signal from a waveform in the time domain into successive vectors in the frequency domain during a process sometimes known as "filterbank analysis". It is possible to apply some form of compensation to these vectors. There are a number of methods which may be used to determine the appropriate compensation. One such method is disclosed by Sadaoki Furui, "Cepstral Analysis Technique for Automatic Speaker Verification", IEEE Trans Acoustics, Speech and Signal processing, 29(2):254–272, April 1981. It involves averaging the output of the filterbank analyser for the entire conversation to obtain the long term spectral characteristics of the signal and applying a compensation for the distortions during a second pass over the data. The compensated data is then passed to the speech recognition device. There are two main problems with this approach. First, since a single correction is applied for the entire conversation it is poorly suited to conversations in which the distortion varies rapidly. This may happen in conversations from cellular, cordless or radio telephones. Secondly, since it is necessary to process the entire conversation to obtain the appropriate correction before recognition commences, it is unsuitable for real time applications.

A preferable approach is to use a technique sometimes known as spectral shape adaptation (SSA). A recognition system using this technique provides information on the expected spectral characteristics of the signal to be recognised at each time instant, and this is compared to the equivalent actually present in that signal to provide a difference term. The difference term is then averaged over a number of successive signals (time averaging) to provide a correction term. A system of this kind has been described by Yunxin Zhao, "Iterative Self-Learning Speaker and Channel Adaptation under Various Initial Conditions", Proc IEEE ICASSP [11] pages 712–715. Here data is processed on a sentence by sentence basis. An input signal undergoes filterbank analysis to create successive vectors each indicating the variation in signal energy over a number of frequency bands. The vectors are processed by matching to speech model states. The parameters of the model state to which a vector has been matched are used to predict a value for that vector which would be expected according to the model. The difference between the vector and the predicted value is computed and time averaged with difference values obtained for earlier vectors from the sentence to determine the average distortion suffered by each sentence. The SSA parameters determined for one sentence are then used to process the next sentence.

Zhao's approach unfortunately does not work in more sophisticated speech recognition systems, for the following reason. In these systems, data vectors (expressed in frequency space) obtained from filterbank analysis are transformed from the frequency domain to some abstract feature space. When correctly applied this transformation improves recognition accuracy, because it reduces unwanted contributions to the speech signal in the form of information which is characteristic of the speaker while preserving features which are characteristic of the words spoken. The model states are represented in the same feature space to which the vectors are transformed. It is normal practice to discard higher order terms in the transformation from frequency space to feature space to improve recognition accuracy as mentioned above, which means there is a reduction in dimensionality; ie feature space vectors have fewer dimensions or vector elements than frequency space vectors. This means that there is a loss of information in the transformation from frequency space to feature space, and therefore it is no longer possible to use the model parameters to provide a unique estimate of the expected value in frequency space because they contain insufficient information for this purpose. This means that compensation in the frequency domain cannot be implemented as described in the Zhao reference mentioned above.

SUMMARY OF THE INVENTION

It is an object of the invention to provide a recognition system with distortion compensation.

The present invention provides a recognition system for associating multi-dimensional data vectors with predetermined models of relatively lower dimensionality, and including:

a) compensating means for compensating for distortion in data vectors, b) transforming means for applying a transformation to data vectors after distortion compensation to reduce their dimensionality to that of the models, c) matching means for associating each transformed data vector with an appropriate model, d) inverting means for obtaining a data vector estimation from the associated model by inversion of the said transformation, and e) deriving means for deriving a compensation from the data vector estimation and the data vector to which it corresponds for use in distortion compensation by the compensating means.

The invention provides the advantage that it provides distortion compensation on the basis of model matching despite reduction in dimensionality. It has been discovered in accordance with the invention that it is possible to provide a data vector estimation for use in compensation despite loss of information prior to matching.

In a preferred embodiment, the inverting means is arranged to implement a pseudo-inverse of the said transformation and to provide an increase in model dimensionality to that of a data vector by including information in a manner such that operation of the transforming means upon the data vector estimation to reduce its dimensionality would result in loss of such information. This embodiment provides the advantage of relative ease of estimation, ie it has been found that a pseudo-inverse model transformation provides an acceptable estimation when information is included for this purpose in such a manner such that it is removed in subsequent operation of the transforming means.

The transforming means may be arranged to apply to data vectors a transformation represented by the function $A(\ )$ and the inverting means may be arranged to implement a pseudo-inverse transformation represented by the function $A^-(\ )$, the functions $A(\ )$ and $A^-(\ )$ satisfying the relationship: $A(A^-(A(q)))=A(q)$ where $q$ is some arbitrary vector.

The deriving means may be arranged to derive a compensation from the data vector estimation and the data vector and preceding estimations and vectors of like kind. It may incorporate an infinite impulse response filter with an exponential time window implementing low pass filtering.

In a preferred embodiment, the system of the invention is arranged for speech recognition and each data vector has elements representing speech signal energy in a respective frequency interval. The deriving means may be arranged to produce compensation vectors for use in distortion compensation, and the compensating means may be arranged to add logarithms of data vector elements to logarithms of respective compensation vector elements. The transforming means is preferably arranged to apply a matrix transformation and the matching means to implement hidden Markov model matching; the inverting means may be arranged to produce data vector estimations from model states associated with transformed data vectors and having gaussian distributions. The matching means may employ model states which are mixtures of gaussian distributions and the inverting means may be arranged to produce data vector estimations therefrom.

The compensating means may alternatively provide for matrix multiplication to compensate for shifts in frequency space. The deriving means may be a Kalman filter.

The matching means may be arranged to implement segmental hidden Markov model matching.

The data vectors may at least partially comprise image information derived from a speaker's lips, and the compensating means may provide compensation for at least one of illumination level, direction and geometrical distortions of the picture.

The transforming means is preferably arranged to apply a cosine transformation in which some coefficients are discarded to reduce data vector dimensionality.

A system of the invention for speech recognition in the presence of distortion preferably includes inverting means and deriving means arranged to provide compensation for at least one of:

a) varying speech signal level, b) change in microphone position, c) change in microphone type, d) change in speech signal line characteristics, e) background noise level, f) frequency shifts, g) speaker illumination level, h) illumination direction, and i) geometrical distortion of a speaker's features.

The invention may alternatively provide compensation for distortions to signals other than speech. It may provide compensation for illumination level or view angle in a recognition system in which information consists partly or wholly of image information from a video camera pointing for example at a person's face.

The deriving means may incorporate an infinite impulse response filter or a Kalman filter for combining contributions from a plurality of data vector estimations to derive a compensation for distortion in data vectors.

In a preferred embodiment of the invention, the matching means is arranged to indicate which of a plurality of model states and model classes are associated with each transformed data vector, the deriving means is arranged to derive a respective compensation for each data vector, and the compensating means is arranged to apply compensation selectively in accordance with model class indicated by the matching means. The matching means may be arranged to implement partial traceback and to indicate matched model states which may at some later time may become revised; in combination with the inverting means and the deriving means, it may provide correction for compensations produced on the basis of such matches.

In a further aspect, the present invention provides a method of associating predetermined multi-dimensional models with data vectors of higher dimensionality than the models, and including the steps of:

a) compensating for distortion in data vectors, b) applying a transformation to data vectors after distortion compensation to reduce their dimensionality to that of the models, c) associating each transformed data vector with a respective model, d) inverting the said transformation to obtain a data vector estimation from the associated model, and e) deriving a compensation from the data vector estimation and the data vector to which it corresponds and using the compensation to compensate data vectors for distortion.

Inverting in step (d) is preferably implemented by means of a pseudo-inverse of the said transformation to provide an increase in model dimensionality to that of a data vector by including information in a manner such that application of the transformation to the data vector estimation to reduce its dimensionality results in loss of such information.

In an alternative aspect, in which transforming means and inverting means are not essential, the present invention provides a recognition system for associating data vectors with predetermined models, and including:

a) compensating means for compensating for distortion in data vectors corresponding to a plurality of different types of data, the compensating means being arranged to apply compensations associated with respective data types to each data vector to produce a plurality of compensated data vectors, b) matching means arranged to associate compensated data vectors and models and to indicate for each data vector an appropriate model and class of model corresponding to a respective data type, and c) deriving means for deriving a compensation from the model indicated by the matching means and the data vector with which it is associated for use by the compensating means in distortion compensation for a respective data type associated with the model class.

BRIEF DESCRIPTION OF THE DRAWINGS

In order that the invention might be more fully understood, embodiments thereof will now be described, by way of example only, with reference to the accompany drawings, in which:

FIG. 6 is a block diagram of a further speech recognition system of the invention arranged to compensate for frequency difference between models and speakers;

DETAILED DISCUSSION OF PREFERRED EMBODIMENTS

Figure 1:
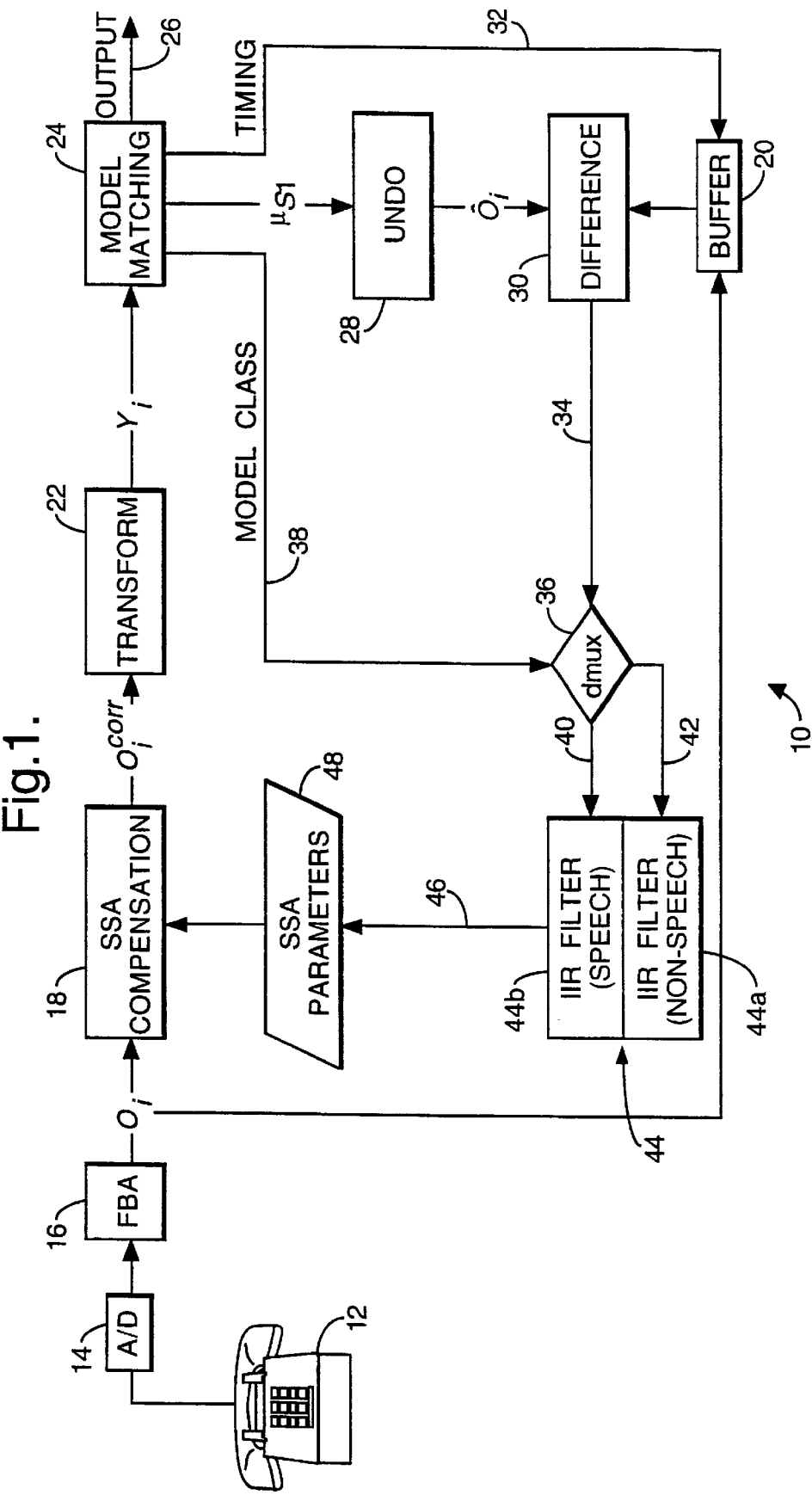
FIG. 1 is a block diagram of a recognition system of the invention in the form of a speech recognition system.

Referring to FIG. 1, an embodiment of the invention in the form of a speech recognition system is indicated generally by 10. The system 10 incorporates a telephone 12 connected to an analogue to digital (A/D) converter 14, which is itself connected to a filterbank analyser 16. The analyser 16 implements a four hundred point discrete Fourier transform (DFT) using a 20 mS Hamming window to deal with the usual problem of non-infinite signal samples. It combines the Fourier components so obtained into twenty-six subsets over which average values are obtained for each of twenty-six frequency intervals or bins on an approximately mel (ie perceptually linear) scale, and produces logarithmic amplitude values. It therefore simulates a bank of bandpass filters with logarithmic outputs in twenty-six channels. Output from the analyser 16 passes both to a compensation unit 18 which provides spectral shape adaptation (SSA) and to a buffer memory 20. The SSA compensation unit 18 is a digital adder. It is connected to a transformation device 22 from which output passes to a model matching computer 24 providing a system output at 26.

The computer 24 is also connected to a match inverter or "undo device" 28, which provides input to a difference calculator 30; this calculator receives a second input from the buffer memory 20, which itself receives timing information from the matching device 24 via a line 32. Output from the difference calculator 30 passes via a line 34 as a first input to a demultiplexer 36, which receives a second input of model class information from the matching device 24 via a line 38. The demultiplexer 36 has two outputs 40 and 42 connected to non-speech and speech sections 44a and 44b of a bank of infinite impulse response (IIR) filters 44. Each of these sections is an array of twenty six IIR filters. A line 46 connects the filter speech section 44b to an SSA parameter store 48, which in turn is connected to the SSA compensation unit 18.

The recognition system 10 operates as follows. An analogue speech signal from the telephone 12 is transformed into a digital signal by the (A/D) converter 14, which samples the signal and provides digital output signals at the rate of 20 KHz. The filterbank analyser 16 uses the digital signals to calculate successive four hundred point discrete Fourier transforms (DFT). The four hundred points output by the DFT for each transform are then 'binned' or separated into sub-groups, added and their logarithm taken to provide average energies on a logarithmic scale for twenty-six frequency intervals. The analyser 16 is the digital equivalent of a bank of twenty-six analogue bandpass filters. Each output transform from the analyser 16 is a vector having twenty-six components, and each component represents the logarithm of the energy in a respective frequency interval obtained by averaging over associated Fourier transform coefficients.

Individual vectors are output from the analyser 16 in succession every 10 mS, and each represents an average over the energy in the speech signal in the previous 20 mS. The $i^{th}$ vector output from the analyser at time $t_i$ is defined as $O_i$. It is stored in the buffer memory 20, which stores the 500 most recently obtained vectors each at a respective address corresponding to its time of production $t_i$.

Each vector $O_i$ is also passed to the compensation unit 18 which applies a transformation using a set of twenty-six parameters $p_j$ (j=0 to 25) stored in the SSA parameter store 48. The production of these parameters will be explained later. The unit 18 adds the contents of the store 48 to the vector $O_i$. The transformation corresponds to an adaptation of the spectral shape of the vector to compensate for distortion. This transformation provides compensation for changes to the mean signal level and linear distortions introduced by signal channel or microphone characteristics.

After compensation in the unit 18, each vector (now referred to as $O_i^{corr}$) is passed to the transformation device 22 which transforms it from the frequency domain or space to produce a vector $Y_i$ in a feature space having fewer dimensions. The device 22 produces a cosine transformation of each compensated vector, and truncates it so that only the first twelve terms of the transformation are retained. Use of a cosine transform is well known in the prior art as a means of improving recognition accuracy by reducing unwanted correlations in the data. Truncation of the cosine transformation is also known in the prior art for the design of speaker independent systems, since it removes unwanted speaker-dependent inaccuracies. The transformation is carried out as a matrix multiplication where the coefficients of the transformation matrix are determined by the characteristics of the required cosine transform. It reduces the dimensionality of the vectors from twenty-six to twelve.

In the present example, implementation of the cosine transformation by the unit 22 involves computation of the components of the feature vectors. Equations (1.a,b) below show the evaluation of the matrix operation:

$$y_0 = \frac{1}{26} \sum_{m=0}^{25} o_m^{corr} \qquad (1.a)$$

$$y_k = \frac{1}{13}\sum_{m=0}^{25} o_m^{corr}\cos((2m+1)k\pi/52)\ k = 1,\ldots 11 \qquad (1.b)$$

where $y_k$ is the $k^{th}$ component of vector $Y_i$ and $o_m^{corr}$ is the $m^{th}$ component of the compensated vector $O_i^{corr}$; m has values 0 to 25 for twenty six channels of filterbank output and k has values 0 to 11 for the first twelve terms of the cosine transform.

The transformed, compensated vectors $Y_i$ are passed to the model matching computer 24. This computer implements a procedure to be described with reference to FIG. 2, which illustrates a simpler feature space of two dimensions (as opposed to twelve in the present example). The model matching computer 24 implements a conventional hidden Markov model matching algorithm of the kind well known in the prior art. See for example the standard text on speech recognition, "Speech Synthesis and Recognition", J N Holmes, Van Nostrand Reinhold (UK) 1988, Chapters 7 and 8 in particular. The computer 24 employs models which are conventional hidden Markov models of telephone speech. Each model corresponds to a word or part of a word (sub-word); each model has a number of states and corresponds to a sequence of sounds. For example, in a digit recogniser for the numbers 0 to 9, ten states per model may be used. A state is represented by a single component gaussian probability distribution having the dimensionality of the feature space; ie the distribution has the form:

$$C_s \exp(-((x_0-\mu_{s,0})/2\sigma_{s,0})^2 - ((x_1-\mu_{s,1})/2\sigma_{s,1})^2 \wedge ((x_n-\mu_{s,11})/2\sigma_{s,11})^2) \qquad (2)$$

where $C_S$ is a constant for the model state, $\mu_{s,k}$ and $\sigma_{S,k}$ (k= 0 . . . 11) are the 12 components of the mean and standard deviation of the probability distribution for model state S in a 12 dimensional feature space, and $X_k$ are variables defining a 12 dimensional feature vector space.

The prior art matching process involves matching vectors with models taking into account the results of earlier vector/model matching, so that the probability of recognition correctness is maximised over a sequence of inputs. This is carried out by dynamic programming.

Figure 2:
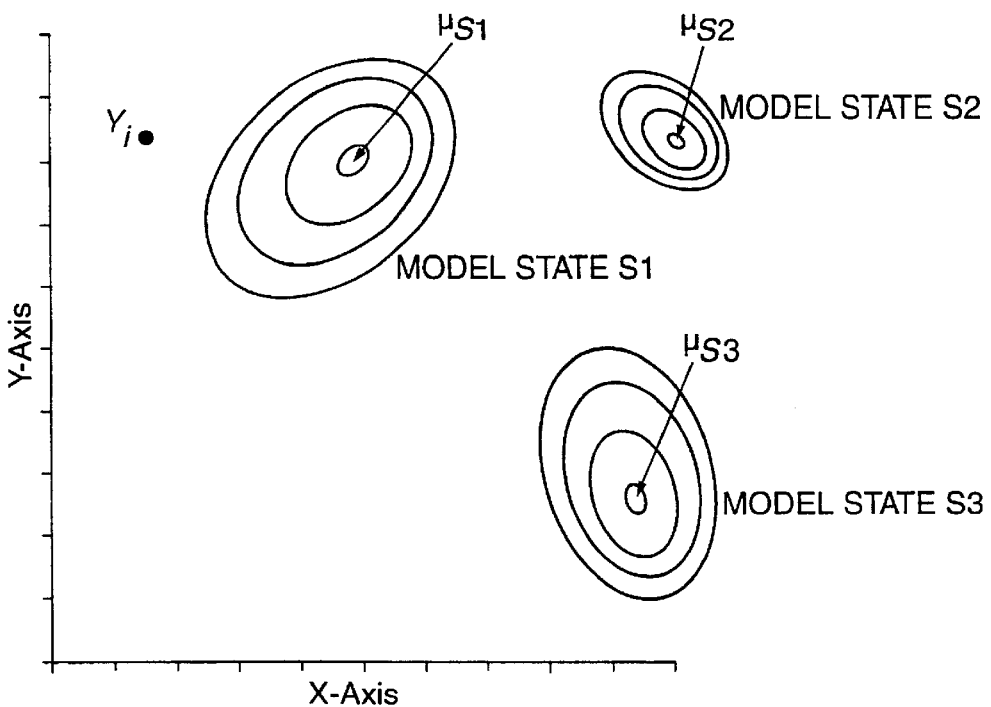
FIG. 2 graphically illustrates speech model states employed in speech recognition in the system of FIG. 1.

FIG. 2 is an illustration of a model having three model states, S1, S2 and S3, ellipses representing probability distribution contours. A two dimensional equivalent of the transformed corrected feature vector $Y_i$ is also shown. The computer 24 uses a model matching algorithm to decide which model state is most appropriate for matching to vector $Y_i$. The probability of a match between a vector and a model state is indicated by the magnitude of the probability distribution of the model state at the position of the vector subject to any constraints imposed by earlier matching history. In the simplified two dimensional situation shown in FIG. 2, probability considerations may indicate that vector $Y_i$ should be matched to model state S1. Unless fortuitously there is an identical match, the value of such a vector expected from the model state S1 which it appears to match will not be equal to $Y_i$. This expected or estimated value is given by the mean value of the probability distribution for S1, and is represented by some feature vector $\mu_{S1}$. The model state mean value is output at 26, and is also passed to the match inverter 28 which implements what is referred to herein as the "Undo" operation.

The purpose of the Undo operation is to make it possible to determine a vector in frequency space to which $\mu_{S1}$ corresponds exactly, as opposed to the inexact association with $Y_i$, in order to use that vector in generating spectral shape adaptation parameters for application in the SSA compensation unit 18 as will be described later.

The Undo operation involves a computation which is mathematically equivalent to the pseudo-inverse of the transformation implemented in the device 22 from frequency space ($O_i$) to feature space ($Y_i$); ie it is a transformation from feature space ($Y_i$) to frequency space ($O_i$). If the transformation from frequency space to feature space is represented by some matrix A, the pseudo-inverse is any matrix $A^-$ which satisfies the relationship:

$$AA^-A = A \qquad (3)$$

If A is square and non-singular, there is just one matrix $A^-$ which is the conventional inverse of A. In recognition systems of the kind to which this invention is addressed, the feature space has fewer dimensions than the frequency space because of the need to dispose of unwanted contributions as described earlier. In consequence some information is discarded and the matrix A is rectangular. Rectangular matrices do not have unique inverses, and it is therefore not possible to obtain a unique inverse of the matrix A.

However, in accordance with the invention it has been found surprisingly that it is possible and beneficial to employ an arbitrary matrix $A^-$ which is a pseudo-inverse of the matrix A without unacceptable adverse effects on the recognition procedure.

In the present embodiment matrix A is a 12×26 component matrix and $A^-$ is a 26×12 component matrix. The coefficients of matrix A are computed to give a truncated cosine transformation. An appropriate pseudo-inverse matrix $A^-$ may be computed by taking the true inverse of a 26 component cosine transform as a 26×26 component matrix and discarding columns to give a 26×12 component matrix. If transformations other than a simple cosine transform are used a pseudo-inverse may be obtained by standard numerical techniques.

If Y is some point in feature space (equivalent to $\mu_{S1}$) and Ô is a corresponding point in frequency space which transforms to Y when multiplied by the matrix A, then one can undo the transformation to obtain Ô using $A^-$ as follows:

$$\hat{O} = A^- Y \qquad (4)$$

Because there is a loss of information in the transformation from frequency to feature space, there are an infinite number of matrices $A^-$ and corresponding values of Ô. However, all such matrices will satisfy:

$$A\hat{O} = AA^- Y = AA^- AO = AO = Y \qquad (5)$$

Equation (5) demonstrates that, when multiplied by the matrix A, both Ô and O transform to Y in feature space for the purposes of recognition by the matching computer 24, and therefore the fact that Ô was created using a pseudo-inverse does not adversely affect the matching process. That is, the arbitrary information added in the pseudo-inverse process becomes eradicated later in the transformation of compensated vectors from frequency space to feature space. In consequence it is possible to undo the frequency to feature space mapping and subsequently "redo" it. The match inverter 28 implements the 'Undo' operation by digital matrix/vector multiplication. It may alternatively be implemented in software within the computer 24.

The match inverter 28 converts $\mu_{S1}$, the components of the mean of the matched model state S1, from feature space back to frequency space to give the corresponding point in frequency space. The vector $\mu_{S1}$, output by the computer 24, is multiplied by the matrix $A^-$. The matrix operation is performed by applying the summation shown in Equation 6 below:

$$\hat{o}_m = \mu_{s1,0} + \sum_{k=1}^{11} \mu_{s1,k} \cos((2m+1)k\pi/52) \ m = 0, \ldots 25 \quad (6)$$

in which $\hat{o}_m$ (m=0 to 25) are the twenty-six components of an output vector $\hat{O}_i$ and $\mu_{S1,0}$ to $\mu_{S1,11}$ are the 12 components of $\mu_{S1}$; here $\hat{O}_i$ is the value predicted for the data vector $O_i$ based on the model to which it was matched and the selected matrix $A^-$.

The value $\hat{O}_i$ is passed to the difference calculator 30. At the same time, the buffer memory 20 receives from the computer 24 timing information in the form of the memory address of the value of $O_i$. In response to this address it outputs $O_i$ to the difference calculator 30 for comparison with $\hat{O}_i$. The difference calculator 30 computes the difference between these predicted and observed vectors to generate a difference vector. The difference vector represents in frequency space an instantaneous estimate of the distortion process which the speech signal has undergone. The estimate is passed to the demultiplexer 36, which at the same time receives model class information in the form of a digital 1 or 0; of these digits, 1 indicates that the model matching computer 24 has recognised speech and 0 that it has recognised noise. The demultiplexer 36 routes the difference calculator output to the speech or non-speech IIR filter section 44a or 44b according to whether it receives 1 or 0 from the computer 24.

The purpose of differentiating between speech and noise by means of the demultiplexer 36 is to deal with the problem that for conversations with long periods with no speech the compensation terms may become distorted by the effects of noise and interference. UK patent GB 2 137 791 A describes a method for using a speech recognition system to determine which portions of the signal correspond to noise and which to speech. Although this prior art method is aimed at determining the spectral characteristics of background noise, it has been found that it is possible to use a similar method to mark regions of speech and noise in the system 10 to derive estimates of compensation from the speech signal and noise separately. This makes the system 10 more suitable for processing calls with extended periods with no speech. It also allows a faster output and a faster adaptation time to be obtained.

A vector which has been identified as being speech as opposed to noise or interference gives rise to a difference vector output at 40 from the demultiplexer 36. This difference is passed to the speech filter section 44b, which as has been said is an array of twenty-six infinite impulse response filters. The filter section 44b incorporates a respective filter for each of the twenty-six components of a difference vector. The difference vector computed by the unit 30 is based on a single data vector, and it represents an instantaneous estimate of the correctable distortion due to microphone and line characteristics combined with differences due to the random nature of speech-like sounds.

The speech filter section 44b has a time constant of 0.5 seconds. It provides short term averaging over several words (eg about three words or 1.5 seconds) which counteracts the effects of random variations and errors of word recognition while tracking longer term variations due to correctable distortions. In response to receipt of each input difference vector it produces an output vector which is an average over that input vector and contributions from earlier input vectors diminishing exponentially with time; the contributions to the output vector arise predominantly from the most recent 50 difference vectors.

The output vector from the speech filter section 44b provides an updated set of parameters which is loaded into the SSA parameter store 48 replacing its existing contents. As described earlier, the updated set of parameters is employed to adapt the spectral shape of the current output from the filterbank analyser 16, and the parameter set is updated in response to matching of each data vector to a speech model state. There is a short delay in producing the match. In one embodiment of the invention in which elements 18 to 48 were implemented collectively by a computer, the time interval required to obtain updated parameters from the speech signal was 0.5 seconds, or about the duration of an average word. In consequence, it compensates for distortions whose effects vary from word to word. Typical prior art systems are much slower to provide compensation than this, and cannot cope with relatively short term distortion. The Zhao reference previously mentioned requires a whole sentence for analysis. In the present example, the transformation employed provides compensation for changes to the mean signal level and linear distortions introduced by signal channel or microphone characteristics.

In the foregoing embodiment of the invention, the non-speech IIR filter section 44a is redundant because its output is not used. Its use will now be described in a further example of the invention involving an alternative implementation of the SSA compensation unit 18 and store 48. In this example, the store 48 contains fifty-two parameters $p_j$ (j=0 to 51), of which indices 0 to 25 correspond to compensation for multiplicative distortions (mean signal level and linear distortions) as described above while indices 26 to 51 correspond to compensation for distortions which are additive on a linear scale (eg channel noise). The SSA compensation unit 18 applies multiplicative corrections to the vector elements of $O_i$ in logarithmic form by addition of the first twenty-six parameters $p_j$ (j=0 to 25). It also includes provision for converting data vector elements from a logarithmic to a linear scale and the reverse of this. It converts the corrected vector elements of $O_i$ from a logarithmic to a linear scale, and applies a linear correction by addition of the second set of twenty-six parameters $p_j$ (j=26 to 51). It then converts the result back to a logarithmic scale. The unit 18 may alternatively apply both corrections in the linear domain by adding the noise correction and multiplying by the distortion correction. The transformation provides compensation for background noise as well as changes to the mean signal level and linear distortions introduced by signal channel or microphone characteristics. To obtain estimates of the parameters for the multiplicative distortions, the speech filter section 44b is used as previously described. To obtain estimates of the parameters for additive noise, the non-speech filter section 44a is used in an analoguous manner.

To demonstrate the performance of the recognition system 10, experiments were made using two different microphones A and B in place of the telephone 12. Tests were performed using spoken reports produced in the course of an airborne reconnaissance mission. The model matching computer 24 was programmed to use standard hidden Markov models based on three state single mixture component monophones. The models were trained on thirty-six airborne reconnaissance mission reports recorded by the same speaker using microphone A. Each report lasted approximately 30 seconds. The computer 24 used a 518 word syntax in which each word was considered equally probable; ie the vocabulary was approximately 518 words. In the experiments, the speaker spoke into both microphones A and B simultaneously. Recordings were made for various microphone positions using a stereo tape recorder. The recordings were then digitised by an analog to digital convertor and transferred to a computer's hard disk. The data were then analysed by a computer program which implemented the filterbank analyser 16. Data were then processed by a second programme which implemented units 18, 20, 22, 24, 28, 30, 36, 44 and 48. Output 26 was recorded to disk for analysis. In a second analysis the action of SSA compensation unit 18, and buffer 20, match inverter 28, difference calculator 30, demultiplexer 36, infinite impulse response filters 44 and SSA parameter store 48 was disabled. The following microphone positions were used:

standard: level with corner of the mouth
central: centrally in front of mouth
low: one inch below the corner of the mouth
chin: level with the chin The table set out below shows error rates for word recognition obtained using microphones (Mic) A and B for three airborne reconnaissance mission reports processed in sequence both for the system 10 equipped with spectral shape adaptation (SSA) and for a comparable system without SSA but otherwise equivalent. It illustrates the effect on word error rates of using SSA in accordance with the invention. In all four microphone positions, the use of SSA with the 'Undo' operation in accordance with the invention gave an improvement in error rate. For microphone B, the improvement was more than a factor of 2, and in one case more than a factor of 3.

| Microphone Position | Error Rate Without SSA | | Error Rate With SSA | |
| --- | --- | --- | --- | --- |
| | Mic A | Mic B | Mic A | Mic B |
| Normal | 22.6% | 47.0% | 20.7% | 22.0% |
| Central | 37.8% | 73.8% | 26.2% | 33.5% |
| Low | 31.7% | 71.3% | 23.8% | 20.1% |
| Chin | 22.0% | 76.2% | 13.4% | 25.6% |

Figure 3:
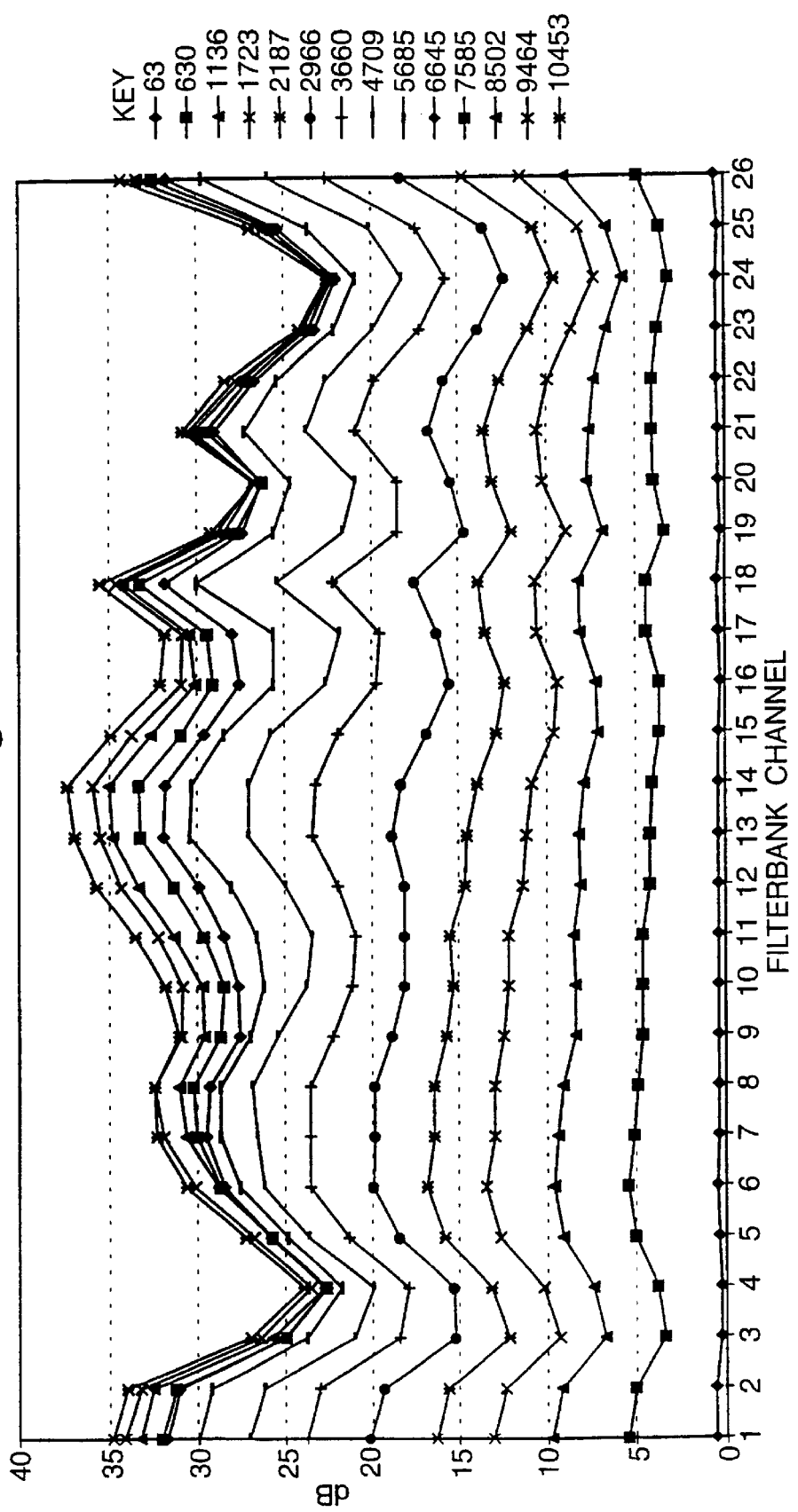
FIGS. 3 and 4 graphically illustrate the process of spectral shape adaptation for two different microphones.
Figure 4:
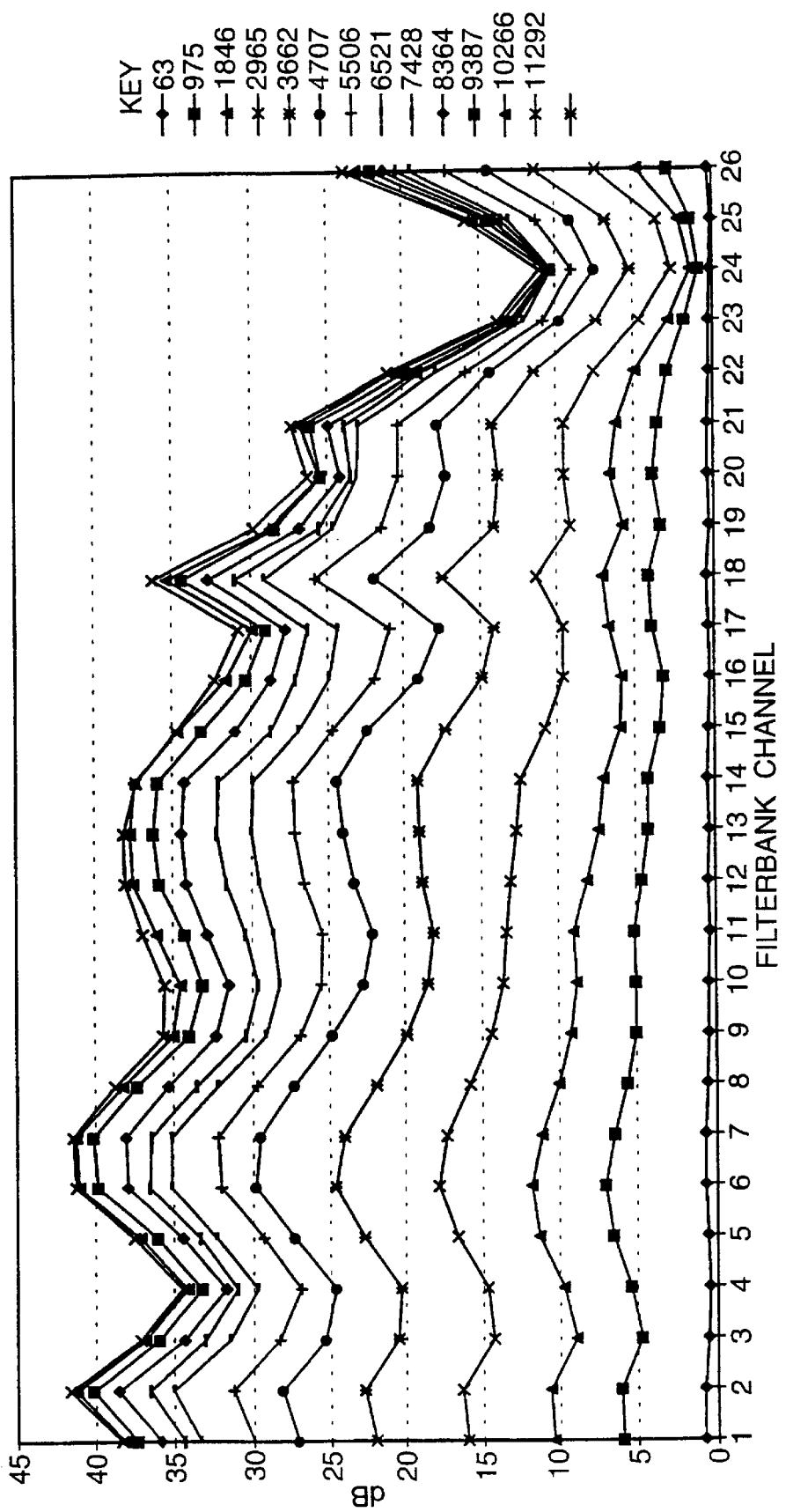

To monitor operation of the invention, the contents of the SSA parameter store 48 (expressed as a compensation vector) were recorded at approximately half second intervals during processing. FIGS. 3 and 4 show the SSA parameters as a function of time for microphones A and B respectively. The parameters (averaged difference vector elements) correspond to and are plotted against respective filterbank channel numbers. The labels in boxes labelled "key" indicate the frame number or time of production $t_i$ expressed in units of 10 mS. During the first 60 seconds ($t_i$<6,000) the values rapidly change and converge towards a fixed profile. Microphone B has greater output at high frequencies, and a minimum at channel 24 in FIG. 3 is the system's compensation for this. The system 10 also makes a significant correction to the overall speech power level, which is comparable to automatic gain control. Rather than being smooth, both FIGS. 3 and 4 display a significant 'ripple' in the correction terms. This is a consequence of the 'undo' operation being based on the pseudo-inverse rather than a true inverse operation; ie the ripples correspond to information introduced by the operation. However, as indicated by Equation 3, the ripples are lost when the frequency domain data are transformed in the device 22 from frequency space ($O_i$) to feature space ($Y_i$), the latter being the model domain. The ripples and the information to which they correspond therefore have substantially no effect on the recognition operation performed by the model matching computer 24.

An improvement to the system 10 may be made to reduce the delay between a data vector being output by the filterbank analyser 16 and its estimated value being used to update SSA parameters in the store 48. In the system 10, compensation parameters are updated each time the matching computer 24 outputs a match between a feature vector and a model state. This output takes place when a process known as 'partial traceback' occurs in the matching computer 24. The process of partial traceback is described in detail in section 7.11 of the Holmes reference previously mentioned. Due to operation of the hidden Markov model matching algorithm, when partial traceback occurs, there are normally a number of recent feature vectors in the matching computer 24 which cannot be unambiguously associated with a model state. That is, while the matching computer 24 might be able to "guess" which model state the most recent feature vectors are associated with, processing of subsequent feature vectors may cause the guessed model state to become revised. For example when processing the phrase "recognise speech", model matcher 24 may require to process feature vectors for the "g" sound in 'recognise' before it is able to confirm the "r" sound comes from the "r" in "recognise" rather than a "wr" as in "wreck a nice beach". This delay may be about 50 vectors or 0.5 seconds. To minimise the impact of this delay, at each partial traceback period, the matching computer 24 may be modified to output a "best guess" match for the feature vectors for which the match is not yet fully confirmed. The demultiplexer 36 and the filter bank 44 may then be modified so that a small correction may be applied if, at some later time, when the matching computer 24 confirms the identity of the "best guess", a change is made to the matched model state (eg if the "best guess" output was "r" when the confirmed match output at some later time was "wr").

Alternatively, if recognition output is not required immediately, the system 10 might be arranged such that an entire word or phrase is captured and processed as described above in a first pass through the system, and then the word or phrase is reprocessed in a second pass using correction terms computed during the first pass. This may be advantageous if only a very small amount of speech is available for processing (eg single words).

Figure 5:
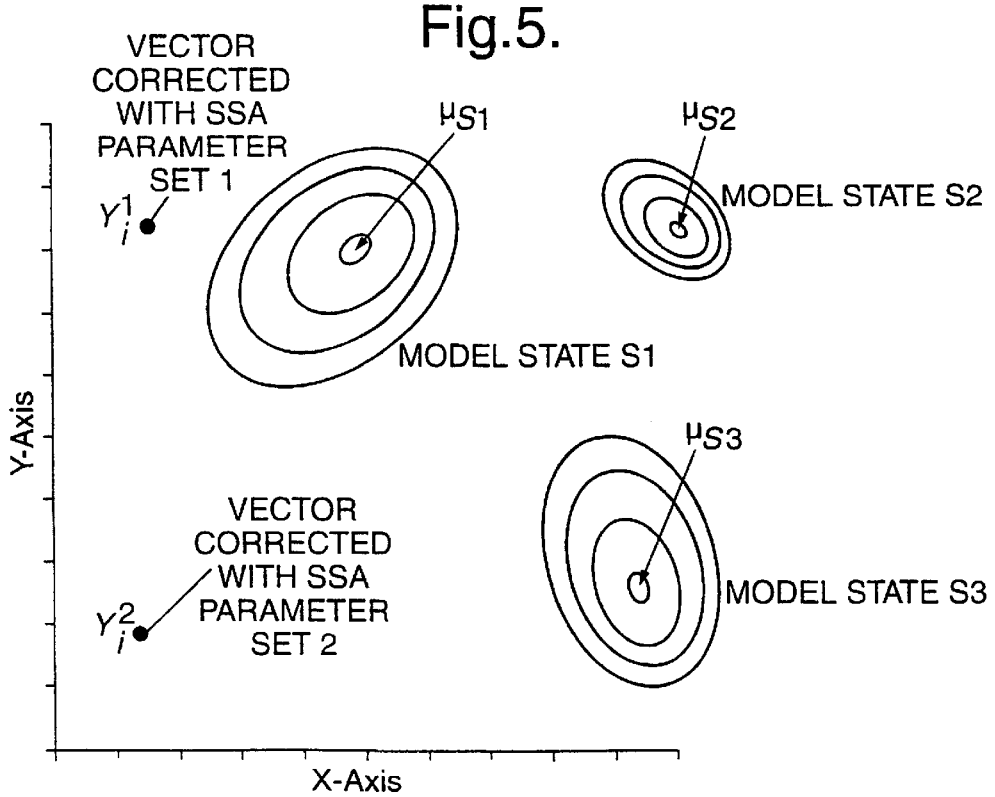
FIG. 5 graphically illustrates the use of speech model states in speech recognition when two speakers are involved.

The system 10 may be adapted for use with two way conversations, or one way telephone connections with reverse channel echo. This is illustrated in FIG. 5 which, like FIG. 2, shows a two dimensional equivalent of the matcher operation. As before, three model states, S1, S2 and S3 are shown, and ellipses represent contours of probability distributions. Two transformed corrected feature vectors $Y_i^1$ and $Y_i^2$ are also shown. In a two way conversation a vector $O_i$ may be produced by either of two speakers, or may correspond to a background noise. Moreover, because microphone and channel characteristics will differ between the two speakers, two sets of SSA parameters are maintained, one for each speaker. When the filterbank output is compensated, two corrected vectors are generated, each using a respective set of parameters. Both corrected vectors are transformed to give $Y_i^1$ and $Y_i^2$ and passed to the matching computer 24, which is configured to match only one of the vectors, that which best fits one of the models. Matching identifies which of the two speakers or background noise is associated with the relevant vector. Each of the two sets of SSA parameters is updated only when its associated speaker or noise has been identified as being responsible for the vector which has been matched and used to generate the correction. The modified system which implements this maintains two sets of SSA parameters in two stores similar to the store 48, one for each speaker/microphone combination. Switching connections to these stores from the IIR filter bank 44 and from these stores to the SSA unit 18 is implemented by demultiplexers under the control of the computer 24 as described in relation to the demultiplexer 36. This approach may be extended to any number of sets of SSA parameters and associated sources of speech and noise for which the computer 24 can be arranged to provide models. It may be used in recognition of multiple sources or data types in reconition systems which do not involve either a transformation from a frequency space to a feature space or an inversion or "undo" operation as described above; ie models may be in the same space and number of dimensions as data vectors. In general it relates to a recognition system which generates a plurality of differing compensations which are distinguished according to which model class or source or type of recognition data (eg speaker A, speaker B or noise) is identified by the matching computer. When a data vector has been identified by the matching computer as belonging to a particular model class by matching to a model of that class, the model so obtained is employed to derive an updated value for the compensation associated with that class. Current compensation values are maintained for each model class. Each data vector undergoes compensation by each of the current compensation values, and gives rise to a plurality of compensated vectors for the matching computer to attempt to match. A compensated data vector will normally only provide a good match if firstly the relevant model to which it is matched is of the correct class for the source or type of data to which the vector corresponds, and if secondly the compensation applied to the vector is appropriate to counteract the distortion it has undergone. Inappropriately compensated data vectors should not match models of the correct type and appropriately compensated data vectors should not match models of the incorrect type. The (uncompensated) data vector and its associated model are then used to derive an updated compensation for the corresponding source or type of data indicated by the model class as mentioned above.

The system 10 may be modified to provide compensation for changes to the speech signal which take the form of shifts in frequency. These may arise as a result of differences between speakers with different vocal tract lengths, for example children compared to adults or females compared to males. It is well known that, for human speech, the energy in the various channels of the filterbank output in the frequency range up to about 4 kHz arise from resonance in the vocal tract. The position of these resonances (known as formants) vary during speech production as a result of changes in the articulation of muscles in the mouth, lips, tongue and other parts of the vocal tract.

The dimensions of the vocal tract will differ between speakers and hence the position of the resonance will vary in a systematic manner between speakers. For example, in measurements performed by Peterson and Barney reported in "Control methods used in a study of vowels", Journal of the Acoustic Society of America, 24 (1952), the normal frequency of the $F_1$ formant in the vowel [a] varies from 730 Hz for a typical adult male to 1030 Hz for a child. Similarly, "The Speech Chain: The physics and biology of spoken language", by Denes and Pinson, Anchor Books (1973) pp 153, indicates that average formant frequencies in the range up to 4,000 Hz for 10 English pure vowel sounds are significantly higher for female speakers compared to male. For frequencies above about 4,000 Hz the sound is primarily generated by other mechanisms and the differences with vocal tract length are less pronounced.

If the speech model set of a recognition system has been trained exclusively using the speech of an adult male, but the system is attempting to recognise the speech of a female or child, then improved performance will result from warping energy from one filterbank output channel to a lower channel. It is possible to provide compensation for this form of distortion by multiplying the data vectors output from the filterbank by a banded matrix B, the elements of B being chosen to provided an appropriate frequency shift. If required, these elements may provide compensation for multiplicative forms of distortion at the same time.

Although the system 10 employs model states in the form of single gaussian distributions, it is also possible to employ mixtures of such distributions because it can be shown that this leads to improvements in matching performance. The match inverter 28 is then arranged to produce data vector estimations obtained from these mixtures. A distribution which is a mixture of two gaussians has the form:

$$C_{s,0} \exp(-((x_0 - \mu_{s,0,0})/2\sigma_{s,0,0})^2 - (($$

$$x_1 - \mu_{s,0,1})/2\sigma_{s,0,1})^2 \ldots ((  $$

$$x_n - \mu_{s,0,11})/2\sigma_{s,0,11})^2) + C_{s,1} \exp(-(($$

$$x_0 - \mu_{s,1,0})/2\sigma_{s,1,0})^2 - (($$

$$x_1 - \mu_{s,1,1})/2\sigma_{s,1,1})^2 \ldots (($$

$$x_n - \mu_{s,1,11})/2\sigma_{s,1,11})^2)$$

where $C_{S,0}$ and $C_{S,1}$ are constants for model state S; $\mu_{s,0,k}$, $\mu_{s,1,k}$, $\sigma_{s,0,k}$ and $\sigma_{s,1,k}$ (k=0 ... 11) are the 12 components of the mean and standard deviation of the two gaussian probability distributions for the model state, and $x_k$ are variables defining an 12 dimensional feature vector space.

The matching computer 24 means may be programmed to implement segmental hidden Markov model matching as for example described by Wendy Holmes in "Speech recognition using a linear dynamic segmental HMM", Proceedings of Eurospeech '95, pp1611–1614 (1995). In this case the match inverter 28 produces data vector estimations from values predicted according to segmental trajectories.

Referring now to FIG. 6, in which elements equivalent to those previously described are like referenced with a prefix 100, there is a system indicated generally by 100 which implements the frequency shift referred to above. The construction and mode of operation of the system 100 is similar to those of the system 10, and the description of the former will be directed largely to aspects where they differ. An input speech signal is digitised and filterbank analysed by units 114 and 116. Filterbank output is then processed by compensation unit 118, which multiplies the filterbank data vectors by a banded matrix B whose matrix elements are stored in a store 148. A banded matrix is a matrix which has non-zero matrix elements in a band of diagonals, all other matrix elements being zero. A transformation device 122 transforms the compensated vectors from the frequency domain to a feature or model domain with fewer dimensions. After transformation, the vectors are matched by a matching computer 124 which outputs the value of the vector which would be expected according to the matching model together with model class information. The expected value is passed to a match inverter 128 for transformation to frequency space to become an estimated vector. The estimated vector is passed via a demultiplexer 136 to a Kalman filter 137 whose role is described in more detail later.

The matrix elements in the banded matrix B are arranged to apply corrections to shift energy from one filterbank channel so that it appears to originate at another frequency. For example, shifting energy in channels 8 and 9 to channels 6 and 7 of the filterbank analyser 116 corresponds approximately to compensating for the differences in the F, formant in the vowel [a] when processing speech spoken by a child with models appropriate to an adult. Alternatively, with non-zero coefficients of B given in the table below, the compensation unit 118 will make a compensation appropriate to a system recognising speech from a female when using speech models appropriate to a male speaker:

| Filterbank channel no | Channel Centre Frequency (Hz) | $B_{i,i}$ | $B_{i,i+1}$ | $B_{i,i+2}$ |
|---|---|---|---|---|
| 0 | 0 | 1 | 0 | 0 |
| 1 | 120 | 0.7 | 0.3 | 0 |
| 2 | 240 | 0.5 | 0.5 | 0 |
| 3 | 360 | 0.3 | 0.6 | 0.1 |
| 4 | 481 | 0.2 | 0.7 | 0.1 |
| 5 | 603 | 0.1 | 0.5 | 0.4 |
| 6 | 729 | 0.1 | 0.5 | 0.4 |
| 7 | 859 | 0.1 | 0.5 | 0.4 |
| 8 | 994 | 0.1 | 0.5 | 0.4 |
| 9 | 1136 | 0.1 | 0.5 | 0.4 |
| 10 | 1286 | 0.1 | 0.5 | 0.4 |
| 11 | 1445 | 0.1 | 0.5 | 0.4 |
| 12 | 1615 | 0.1 | 0.5 | 0.4 |
| 13 | 1796 | 0.1 | 0.5 | 0.4 |
| 14 | 1990 | 0.1 | 0.5 | 0.4 |
| 15 | 2198 | 0.1 | 0.6 | 0.3 |
| 16 | 2421 | 0.1 | 0.6 | 0.3 |
| 17 | 2670 | 0.2 | 0.6 | 0.2 |
| 18 | 2962 | 0.3 | 0.6 | 0.1 |
| 19 | 3315 | 0.4 | 0.6 | 0 |
| 20 | 3747 | 0.7 | 0.3 | 0 |
| 21 | 4277 | 1 | 0 | 0 |
| 22 | 4921 | 1 | 0 | 0 |
| 23 | 5700 | 1 | 0 | 0 |
| 24 | 6629 | 1 | 0 | 0 |
| 25 | 7728 | 1 | 0 | 0 |

The role of the Kalman filter 137 will now be described. Kalman filtering is well known in many areas of electronic engineering, especially the design of radar systems; it may be used to determine the coefficients of a linear system (such as a matrix) in which the observations form a time sequence and have been subject to some random disturbance. The compensation parameters or matrix elements implemented by the system 100 are expressed as a twenty-six square matrix B whose parameters are estimated by the Kalman filter. The speech output of the demultiplexer 136 is used to provide estimates of the filterbank output expected according to the matched model state while a buffer 120 contains the stored value actually observed. These two values are compared by the Kalman filter and used to update the elements of the matrix B.

The design and implementation of Kalman filters are well known in many areas of digital signal processing and, for example are described by Athanasios Papoulis in "Probability, Random Variables and Stochastic Processes", McGraw-Hill series in Electrical Engineering, 1984, pp 458 ff. The Kalman filter 137 updates the elements of the matrix B stored in a store 148. This provides compensation for systematic shifts in energy between different filterbank channels such as occur between speakers with differing vocal tract length as well as compensation for microphone and channel effects as previously noted. The compensation unit 118 may implement addition of a vector as well as matrix multiplication to compensate for additive noise in addition to providing frequency shift.

Compensation for frequency shifts may alternatively be applied by making changes to the binning operation (frequency averaging) performed in filterbank analysis after Fourier transformation.

In either of the systems 10 and 100, parameters of the models implemented by the computer 24 or 124 may be adapted, for example to improve modelling of the accent or dialect spoken by a speaker.

The invention may also be applied to other recognition techniques. It may be employed to identify non-speech sounds from a microphone to detect predetermined events. Alternatively it may compensate for illumination levels in data from a video camera, such as in lip reading as disclosed by Brooke, Tomlinson and Moore in "Automatic Speech Recognition that Includes Visual Speech Cues" in Proc. Inst. Acoustics. 1994 Autumn Conference, Windemere, pp 15–22. It may also be used in connection with techniques in which data is mapped into a feature space with reduction in dimensionality to minimise the effects of noise or other unwanted contributions. Such techniques are used in processing radar data in particular. Compensation for systematic distortion processes are often possible in the data domain which cannot easily be applied in the model domain.

The invention may in particular be employed in a radar imaging sensor having a wavelength in the millimetric range. Data vectors represent two dimensional images of a scene. The transformation of the data vectors might be a two dimensional, truncated, fast Fourier transform to allow matching to a model of an object. Compensation for distortion in a radar image plane might then be implemented.

What is claimed is:

1. A recognition system for associating multi-dimensional data vectors with predetermined models, and including:

a) compensating means (18) for compensating for distortion in data vectors, b) matching means (24) for associating each compensated data vector with an appropriate model, characterised in that:

c) the models are of lower dimensionality than the data vectors, d) the matching means (24) includes transforming means (22) for applying a transformation to data vectors after distortion compensation to reduce their dimensionality to that of the models, e) the system (10) includes inverting means (28) for obtaining a data vector estimation from the associated model by inversion of the said transformation, and f) the system (10) also includes deriving means (30) for deriving a compensation from the data vector estimation and the data vector to which it corresponds for use in distortion compensation by the compensating means.

2. A system according to claim 1 wherein the inverting means is arranged to implement a pseudo-inverse of the said transformation and to provide an increase in data vector estimation dimensionality to that of a data vector by including information in a manner such that operation of the transforming means upon the data vector estimation to reduce its dimensionality would result in loss of such information.

3. A system according to claim 2 characterised in that the transforming means (22) is arranged to apply to data vectors a transformation represented by the matrix A, the inverting means (28) is arranged to implement a pseudo-inverse model transformation represented by the matrix $A^-$, and the matrices $A$ and $A^-$ satisfy the relationship:

$$AA^-A=A.$$

4. A system according to claim 2 characterised in that the deriving means (30) is arranged to derive a compensation by averaging over a contribution from the data vector estimation and the data vector and one or more preceding contributions of like kind.

5. A system according to claim 2 arranged for speech recognition characterised in that the data vectors are representations of a speech signal as a function of frequency.

6. A system according to claim 2 characterised in that the data vectors consist at least partially of video image data.

7. A system according to claim 6 arranged for speech recognition characterised in that the data vectors are representations partially of a speech signal and partially of speaker features.

8. A system according to claim 2 arranged for speech recognition characterised in that the data vectors are representations of a speech signal, the matching means (24) is arranged to implement hidden Markov model matching and the inverting means (28) is arranged to produce data vector estimations computed from the probability distributions of models associated with transformed data vectors.

9. A system according to claim 8 characterised in that the matching means (24) is arranged to implement segmental hidden Markov model matching and the inverting means (28) is arranged to produce data vector estimations from the estimates of the segment trajectories as computed by the matching means (24).

10. A system according to claim 2 characterised in that the matching means (24) is arranged to indicate which of a plurality of model classes is associated with each transformed data vector.

11. A system according to claim 10 characterised in that the matching means (24) is arranged to implement a respective set of models for each model class, the deriving means (30) is arranged to derive a respective compensation for each model class, and the compensating means (18) is arranged to apply compensation selectively in accordance with model class.

12. A system according to claim 11 characterised in that the matching means (24) is arranged to implement a respective set of models for each of two speakers.

13. A system according to claim 2 characterised in that the transforming means (22) is arranged to implement a frequency shift to counteract difference between observed data vectors and data vectors to which the models employed by the matching means (24) correspond.

14. A system according to claim 2 characterised in that the transforming means (22) is arranged to implement compensation by means of a banded matrix.

15. A system according to claim 2 characterised in that the deriving means (30) is arranged to update compensation in accordance with Kalman filtering.

16. A system according to claim 2 characterised in that the transforming means (22) is arranged to apply a cosine transformation in which some coefficients are discarded to reduce data vector dimensionality.

17. A system according to claim 2 arranged for speech recognition in the presence of distortion, characterised in that the inverting means (28) and the deriving means (30) are arranged to provide compensation for at least one of:

a) varying speech signal level, b) change in microphone position, c) change in microphone type, d) change in speech signal line characteristics, e) background noise level, f) frequency shifts, g) speaker illumination level, h) illumination direction, and i) geometrical distortion of a speaker's features.

18. A system according to claim 2 characterised in that the deriving means (30) is arranged to counteract random variations exhibited by data vectors which might otherwise affect compensation.

19. A system according to claim 2 arranged to provide for double transit of the system by each data vector characterised in that the compensating means is arranged to operate in a second such transit and to provide for compensation to be applied to a data vector from which it is obtained.

20. A system according to claim 2 characterised in that the matching means (24) is arranged to implement partial traceback for correction of recognition errors, and, in combination with the inverting means (28) and the deriving means (30), to provide correction for compensations produced on the basis of such errors.

21. A system according to claim 1 characterised in that:

a) the compensating means is arranged to compensate for a plurality of forms of distortion by modifying each data vector with a plurality of compensations to provide a respective set of modified data vectors compensated for respective forms of distortion associated with respective data sources, b) the transforming means is arranged to transform each set of modified data vectors to provide a respective of transformed data vectors, c) the matching means is arranged to ascertain which transformed data vector in each set best fits one of the models and to indicate for that transformed data vector a corresponding data source, and d) the deriving means is arranged to derive compensation on the basis of the ascertained best fit for use in compensating for the form of distortion associated with the data source indicated by the matching means.

22. A method of associating predetermined multi-dimensional models with data vectors including the steps of:

a) compensating for distortion in data vectors, b) applying a transformation to data vectors after distortion compensation to reduce their dimensionality to that of the models, and c) associating each transformed data vector with a respective model, characterised in that the data vectors are of higher dimensionality than the models, and the method also includes:

d) inverting the said transformation to obtain a data vector estimation from the associated model, and e) deriving a compensation from the data vector estimation and the data vector to which it corresponds and using the compensation to compensate data vectors for distortion.

23. A method according to claim 22 wherein the inverting step (d) is implemented by means of a pseudo-inverse of said transformation and provides an increase in data vector estimation dimensionality to that of a data vector by including information in a manner such that application of the transformation to the data vector estimation to reduce its dimensionality results in loss of such information.

24. A recognition system for associating multi-dimensional data vectors with predetermined models, and including:

a) compensating means (18) for compensating for distortion in data vectors, b) matching means (24) for associating compensated data vectors with appropriate models, characterized in that:

c) the models do not fully reflect data vector dimensionality, d) the matching means (24) includes transforming means (22) for applying a transformation to data vectors after distortion compensation, the transformation implementing inter alia a reduction in information content corresponding to reduced data vector dimensionality, e) the system (10) includes inverting means (28) for obtaining a data vector estimation from the associated model by inversion of the said transformation, and f) the system (10) also includes deriving means (30) for deriving a compensation from the data vector estimation and the data vector to which it corresponds for use in distortion compensation by the compensating means.

25. A method of associating predetermined multi-dimensional models with data vectors including the steps of:

a) compensating for distortion in data vectors, b) applying a transformation to data vectors after distortion compensation, the transformation implementing inter alia a reduction in information content corresponding to reduced data vector dimensionality, and c) associating transformed data vectors with corresponding models, characterized in that the models do not fully reflect data vector dimensionality, and the method also includes:

d) inverting the said transformation to obtain a data vector estimation from the associated model, and e) deriving a compensation from the data vector estimation and the data vector to which it corresponds and using the compensation to compensate data vectors for distortion.

* * * * *